United States Patent

Seymour

[15] 3,637,996
[45] Jan. 25, 1972

[54] NAVIGATIONAL DISTANCE COMPUTER

[72] Inventor: Malcolm Seymour, South Bristol, Maine
[73] Assignee: Prototypes, Inc., South Bristol, Maine
[22] Filed: Oct. 20, 1969
[21] Appl. No.: 867,772

[52] U.S. Cl. ............235/92 FQ, 235/92 R, 235/92 DN, 235/92 EA, 73/181
[51] Int. Cl. .............................................. H03k 21/00
[58] Field of Search ..........235/92, 29 TF, 65, 92 TC, 92 DN; 73/490, 498, 181, 186; 324/160, 166, 68 C

[56] References Cited

UNITED STATES PATENTS

| | | | |
|---|---|---|---|
| 3,114,260 | 12/1963 | Soller et al. | 73/181 |
| 3,354,714 | 11/1967 | Condon et al. | 73/186 |
| 3,362,220 | 1/1968 | Donoho | 73/181 |
| 3,431,778 | 3/1969 | Lemon et al. | 73/181 |

Primary Examiner—Maynard R. Wilbur
Assistant Examiner—Joseph M. Thesz
Attorney—Martin Kirkpatrick

[57] ABSTRACT

A manually presettable speed, continuously indicating, computed distance navigational computer for vessels comprising an electrical preset speed display meter, an electromechanical digital computed mileage indicator, a pulse generator for operating the mileage indicator to provide a continuous digital display of computed distance travelled at a preset rate with the passage of time and a manually adjustable electrical resistor common to the pulse generator and meter for establishing the pulse generator frequency and operating the meter to display the estimated preset speed needed to product the computed distance travelled with time at said preset speed for setting a desired speed into the computer. Actual speed through the water may also be displayed on the meter.

2 Claims, 1 Drawing Figure

PATENTED JAN 25 1972      3,637,996
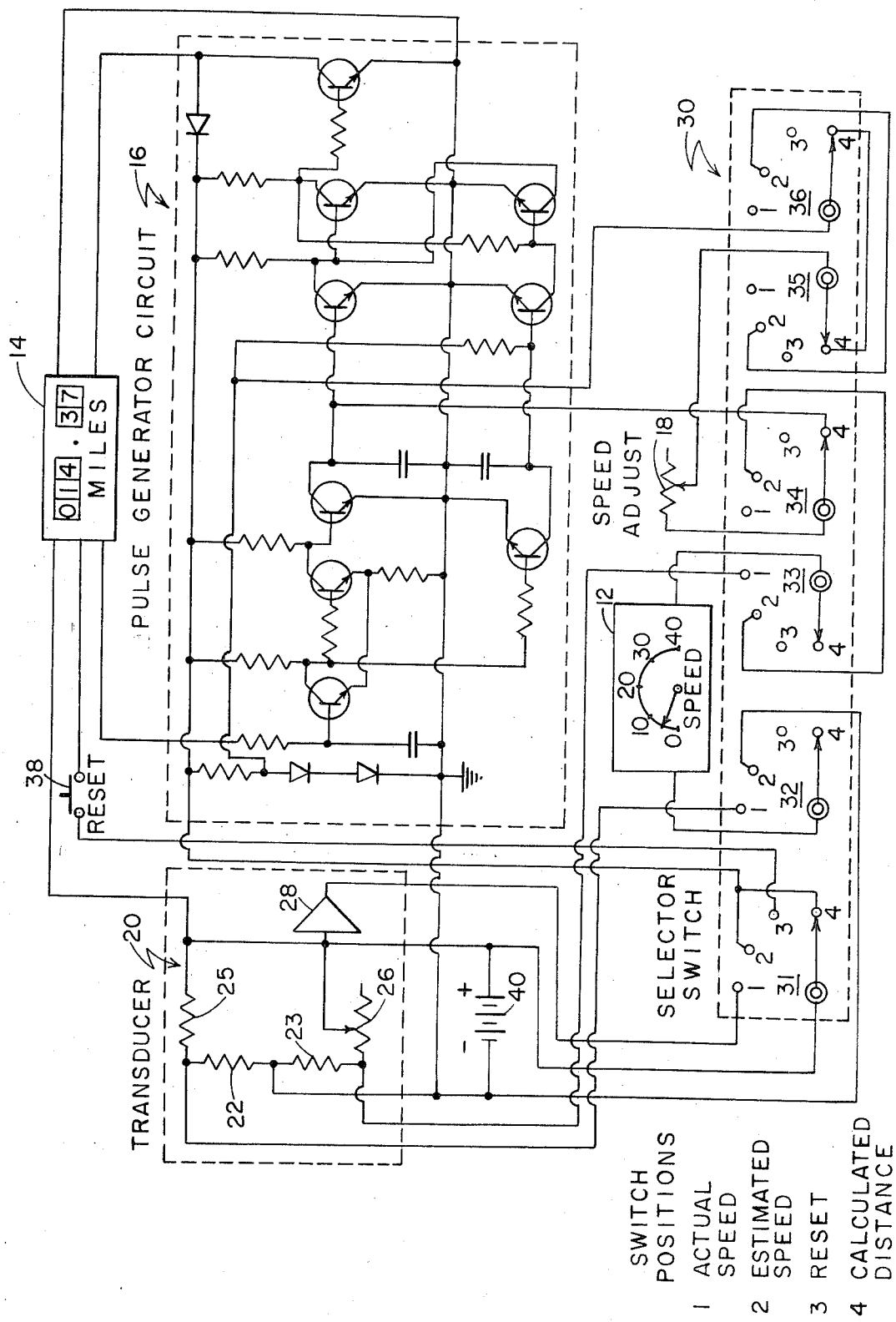

NAVIGATIONAL DISTANCE COMPUTER

This invention relates to navigation and more particularly to a novel manually presettable speed, continuously indicating, computed distance computer.

Ship and boat logs, generally of the type using a screw propeller, have long been used for continuously indicating the distance a ship or boat has passed through the water in a given time. The accuracy of these devices left much to be desired, however, due to the vagaries of friction on the rotating parts, damage to a fouling of the propeller by floating material, errors introduced by wave action, and the like. Even more important, there was no way of adjusting these devices to compensate for the effect of currents, whether caused by wind, tide or otherwise, even though their values might be known. As a result, the distance measured by such logs frequently diverged widely from the distance the vessel travelled over the bottom.

Accordingly, it is a major object of the present invention to provide a manually presettable continuously indicating computed distance computer which may be adjusted by the operator to compensate for currents and the like so that the distance over the bottom rather than simply distance through the water is indicated thereby.

It is another object of the invention to provide a continuously indicating distance computer which is not dependent upon means such as screw propellers external to the hull of the vessel subject to fouling and damage and hence inaccuracies.

It is still another object of the invention to provide a continuously indicating distance computer which may be used in conjunction with vessel speed or rate indicating devices such as conventional boat speedometers.

To these ends, the present invention provides a novel manually presettable speed, continuously indicating, computed distance computer comprising preset speed display means preferably including a digital distance indicator responsive to an electric pulse to display a digital computed distance increment thereon. Pulse generator means are provided connected to said distance display means producing a train of electric output pulses at a predetermined frequency manually preset by the operator to a desired speed for operating said distance display means to provide a continuous digital display of computed distance travelled at the preset speed with the passage of time. For adjusting said frequency, manually adjustable means, preferably including common electrical resistance means, are provided connected to said pulse generator means and said electrical meter, said electrical resistance means establishing said predetermined frequency and operating said meter to display the preset speed necessary to produce said computed distance travelled with time for setting a desired preset speed into said computer means. There is also preferably provided an electrical power source, preferably a battery, connected to the pulse generator and adjusting means, as well as speed or rate sensing means connected to said power source and said electrical meter displaying an actual speed by said speed indicia for setting said desired preset speed into said computer. Such sensing means may be of the electrical strain gage type shown, for example, in my U.S. Pat. No. 3,380,299.

For the purpose of more fully describing a preferred embodiment of the invention, reference is now made to the following detailed description thereof, together with the appended drawing.

In the drawing is shown a circuit diagram of the manually presettable speed, continuously indicating, computed distance computer according to the present invention. In general, as appears in the dotted line blocks thereon, the major elements of such computer consist of a preset speed display meter 12, a digital distance indicator 14, a pulse generator 16 and a manually adjustable electrical resistor 18, common to the pulse generator 16 and speed display meter 12, performing the dual function of establishing the frequency of pulse generator 16 and of operating speed display meter 12 to display the preset speed which will produce the corresponding computed distance travelled with time, to enable a desired speed to be set into the computer. Also included is a speed-sensing transducer 20, such as is shown in U.S. Pat. No. 3,380,299 which displays on meter 12 an actual speed through the water as an aid for setting a desired preset speed, such as an estimated speed.

A multiple section selector switch, generally designated 30, having a six of sections 31 through 36, with four positions defined by terminals 1 through 4 at each section, designated as terminals 31-1 through 31-4, 32-1 through 32-4, 33-1 through 33-4, 34-1 through 34-4, 35-1 through 35-4 and 36-1 through 36-4, is provided for switching the computer to a selected one of the functions provided, as follows:

Position 1 connects actual speed-sensing transducer 20 to speed display meter 12 for a display of actual vessel speed through the water;

Position 2 connects adjustable resistor 18 to estimated speed display meter 12 for setting a desired speed into the computer;

Position 3 is a reset position for distance indicator 14; and

Position 4 connects adjustable resistor 18 to pulse generator 16 for the operation of distance indicator 14 to continuously indicate the distance travelled at the preset speed.

More specifically as to the circuitry of the drawing including the above-mentioned elements, speed display meter 12 operates as an ohmmeter in series with a source of DC voltage such as battery 40 and, selectively, either adjustable resistor 18 or the bridge circuit of speed-sensing transducer 20. The latter includes a pair of strain gage resistors 22, 23, a fixed resistor 25, a calibrating resistor 26, and, preferably, an amplifier 28. Then, with the selector switch 30 in its position 1, the computer function of the invention does not operate, but rather meter 12 simply displays the actual vessel speed through the water as an ordinary speedometer. The speed so indicated is useful in determining an estimated preset speed over the bottom on which to base a calculated distance measurement.

Pulse generator 16 is an adjustable resistor-capacitor type known to the art for producing pulses at a predetermined selected rate for operating the well-known electromechanical type of distance indicator 14 preferably having increments of 0.01 mile. It is provided with a reset, operated by momentary switch 38 in series with selector switch terminal 31-3. If desired, indicator 14 may be of a settable dual type which counts both forward and backward and may be of the predetermined type provided with an alarm operable at a preset distance, these expedients being well known in the electromechanical counter art and so being unnecessary to describe in detail herein.

Manually, adjustable resistor 18 provides the means for the operator's selecting the pulse frequency of pulse generator 16, uniquely in terms of a desired estimated preset speed as indicated on meter 12, it being switched to connect it to pulse generator 16 for such purpose in selector switch position 4 for operating mileage indicator 14. If desired, such switching can be eliminated by utilizing a two-section ganged resistor, with the sections connected one to meter 12 and the other to pulse generator 16 to provide the common resistance means. Similarly a dual pointer may be used to provide a simultaneous indication of actual speed through the water and estimated true preset speed to eliminate the necessity of switching.

In operation, the computer of the invention is first manually preset by the operator to an estimated speed with selector switch 30 in position 2. To accomplish this, resistor 18 is manually moved until the pointer of meter 12 is opposite the desired speed indicia on the meter. This uniquely provides a manually adjusted presetting of resistor 18 which with selector switch 30 in position 4, establishes a pulse rate of pulse generator 16 for driving distance indicator 14 in mileage increments corresponding to the estimated preset speed, so that the estimated distance is continuously indicated on distance indicator 14. When desired, as when the destination is reached, the distance indicator may be reset by turning selector switch 30 to position 3 and depressing momentary switch 38.

If desired, transducer 20 might be connected to position 4 of switch 30 so that actual speed will be displayed on meter 12 during computed distance counting by distance indicator 14, and other variations as well will occur to those skilled in the art.

What is claimed is:

1. A manually presettable, continuously indicating, computed distance computer for computing distance from an estimated speed comprising presettable speed display means including an electrical meter having a dial with speed indicia thereon for establishing a desired estimated speed computed distance display means including a digital distance indicator responsive to an electric pulse to display a digital distance increment thereon a source of electric power pulse generator means connected to said source and said distance display means producing a train of electric output pulses at a presettable frequency for operating said distance display means to provide a continuous digital display of computed distance travelled at a preset estimated speed with the passage of time manually presettable adjustment means including continuously variable electrical resistance means connected to said source and common to said pulse generator means and said electrical meter, said electrical resistance means being adjusted by operating said meter to display a desired estimated speed to establish said predetermined pulse frequency and continuously produce said computed distance travelled with time on said distance display means.

2. A manually presettable computer as claimed in claim 1, further including electrical strain gage actual speed-sensing means connected to said source and said electrical meter displaying an actual speed by said speed indicia for aiding in setting said desired estimated speed.

* * * * *